(12) United States Patent
Citti et al.

(10) Patent No.: US 8,609,563 B2
(45) Date of Patent: Dec. 17, 2013

(54) SINTERED PRODUCT BASED ON CHROMIUM OXIDE

(75) Inventors: Olivier Citti, Wellesley, MA (US); Julien Fourcade, Shrewsbury, MA (US)

(73) Assignee: Saint-Gobain Centre de Recherches et d'Etudes Europeen, Courbevoie (FR)

( * ) Notice: Subject to any disclaimer, the term of this patent is extended or adjusted under 35 U.S.C. 154(b) by 70 days.

(21) Appl. No.: 13/264,579

(22) PCT Filed: Apr. 15, 2010

(86) PCT No.: PCT/IB2010/051646
§ 371 (c)(1),
(2), (4) Date: Nov. 28, 2011

(87) PCT Pub. No.: WO2010/119422
PCT Pub. Date: Oct. 21, 2010

(65) Prior Publication Data
US 2012/0067086 A1    Mar. 22, 2012

(30) Foreign Application Priority Data

Apr. 15, 2009   (FR) ..................... 09 52469

(51) Int. Cl.
*C04B 35/12*    (2006.01)
*C04B 35/101*   (2006.01)
*C04B 35/482*   (2006.01)

(52) U.S. Cl.
USPC ............ 501/132; 501/103; 501/105; 501/127

(58) Field of Classification Search
USPC .......................... 501/103, 105, 126, 127, 132
See application file for complete search history.

(56) References Cited

U.S. PATENT DOCUMENTS

| 4,724,224 | A |   | 2/1988  | Staley, Jr. et al. |         |
|-----------|---|---|---------|--------------------|---------|
| 5,021,375 | A | * | 6/1991  | Butkus             | 501/132 |
| 5,053,366 | A |   | 10/1991 | Schoennahl         |         |
| 5,106,795 | A |   | 4/1992  | Drake et al.       |         |
| 5,306,451 | A |   | 4/1994  | Wächter            |         |
| 6,815,386 | B1 |   | 11/2004 | Kwong et al.   |         |
| 7,396,789 | B2 | * | 7/2008  | Champion et al. | 501/103 |
| 7,754,633 | B2 | * | 7/2010  | Prior et al.   | 501/132 |
| 8,173,564 | B2 | * | 5/2012  | Champion et al. | 501/132 |
| 2006/0211566 | A1 |   | 9/2006  | Champion et al. |         |
| 2010/0019419 | A1 | * | 1/2010  | Prior et al.  | 264/669 |

FOREIGN PATENT DOCUMENTS

| DE | 40 16 581 A1 | 11/1990 |
| EP | 0 546 432 B1 | 6/1993 |
| FR | 2 647 435 A1 | 11/1990 |
| WO | WO 88/00931 A1 | 2/1988 |
| WO | WO 2010/011516 A2 | 1/2010 |

OTHER PUBLICATIONS

Guo et al., "Effect of Coal Slag on the Wear Rate and Microstructure of the $ZrO_2$-Bearing Chromia Refractories," Ceramics International, vol. 23, pp. 489-496, 1997.
Routschka et al., "Taschenbuch Feuerfeste Werkstoffe, 4.Auflage," Vulkan Verlag, XP002554648, pp. 143-147, Jul. 31, 2007.
Degtyareva et al., "Sintering Chromic Oxide with an Additive," Refractories, vol. 11-12, No. 9, pp. 696-701, XP009110907, Jan. 1, 1975.
Degtyareva et al., "New Refractories for the Glass Furnaces of the Glass-Fiber Sector," Ukrainian Scientific-Research Institute of Refractories, XP002593477, pp. 610-616, Oct. 1, 1977.
Bennet et al., "An Analysis of the Causes of Failure in High Chrome Oxide Refractory Materials from Slagging Gasifiers," Report DOE/NETL-IR-2006-183, XP002593478, pp. 1-6, Jan. 1, 2006.
Guo et al., "The Optimization of the Microsturcture and Phase Assemblage of High Chromia Refractories," Journal of the European Ceramic Society, vol. 19, pp. 113-117, 1999.
Nov. 10, 2009 Preliminary Search Report issued in French Application No. 0952469 with partial translation of Categories of Documents Cited.
Jun. 8, 2010 International Search Report and Written Opinion issued in International Application No. PCT/IB2010/051646.

* cited by examiner

*Primary Examiner* — Karl Group
(74) *Attorney, Agent, or Firm* — Oliff & Berridge, PLC

(57) ABSTRACT

A sintered product presenting a mean chemical composition such that, in percentages by weight based on the oxides:
$Cr_2O_3$: 72.0%-98.9%
$2\% < Al_2O_3 \leq 20\%$
$0.1\% \leq TiO_2 \leq 6.0\%$
$ZrO_2 < 4.0\%$
$SiO_2 \leq 0.9\%$.

17 Claims, No Drawings

SINTERED PRODUCT BASED ON CHROMIUM OXIDE

TECHNICAL FIELD

This disclosure relates in particular to a novel sintered product made from chromium oxide, and to a method of fabricating it, and to a use thereof, in particular in a glass-making furnace.

STATE OF THE ART

Amongst refractory products, a distinction is drawn between fused and cast products and sintered products.

Unlike sintered products, fused and cast products usually have a very abundant, intergranular, vitreous phase that fills in spaces between grains in an array of crystallized grains. The problems sintered products and cast products encounter in their respective applications, and the appropriate technical solutions for solving them, are thus generally different. Furthermore, because of considerable differences between their fabrication methods, a composition for fabricating a cast product is not a priori usable as such for fabricating a sintered product, and vice versa.

Sintered products are obtained by mixing suitable raw materials, with the mixture being shaped while green, and then the resulting green part is fired at a temperature and for a length of time that are sufficient to obtain sintering of this green part.

Depending on their chemical compositions, sintered products are intended for a very wide variety of industries.

FR 2 647 435 proposes sintered products based on chromium oxide and including titanium oxide and monoclinic zirconia, which products present good resistance to thermal shocks and to corrosion by molten glass.

EP 0 546 432 proposes sintered products based on chromium oxide and including titanium oxide.

Sintered products based on chromium oxide are nowadays in widespread use in glass-making furnaces, in particular in furnaces for melting glass for use in fabricating glass fibers. Indeed, dense chromium oxide products present excellent resistance to corrosion. Thus, U.S. Pat. No. 4,724,224 describes a sintered block based on chromium oxide that presents good resistance to corrosion by molten glass. That product includes at least about 1% of silica.

Nevertheless, chromium oxide is particularly sensitive to sublimation when it is subjected to temperatures higher than 1000° C. under an oxidizing atmosphere, in particular in the presence of humidity.

Finally, if the glass contains volatile species, such as alkaline borates or soda (NaOH), those elements react with chromium oxide to form alkaline chromates such as $Na_2CrO_4$. These reactions encourage sublimation of chromium oxide, increase corrosion, and may lead to chromium oxides and chromates recondensing in cooler zones of the furnace, such as in the circuit for venting fumes (in the form of dust) to the atmosphere or else on the faces of blocks that are less exposed to heat, e.g. at the back of the blocks. When such recondensation takes place behind feeder blocks or tank blocks, there is also an increased risk of releasing chromium-rich inclusions into the glass.

The present development of glass of very high quality increases the requirements that need to be satisfied by refractory products for glass-making furnaces, in particular for products that are used in the tank. Thus, there exists a need for a novel refractory product presenting good resistance to sublimation.

The present disclosure aims at satisfying this need.

SUMMARY

For this purpose, provided is a sintered product presenting a mean chemical composition such that, in percentages by weight based on the oxides:
  $Cr_2O_3$: 72.0%-98.9%
  $1\% \leq Al_2O_3 \leq 20\%$
  $0.1\% \leq TiO_2 \leq 6.0\%$
  $SiO_2 \leq 0.9\%$.

In unexpected way, the inventors have discovered that this composition makes it possible to achieve remarkable performance, and in particular very good resistance to sublimation.

A product of the invention is thus well adapted to an application such as a tank block, in particular when it is to come into contact with molten glass such as reinforcing glass (E-glass).

Preferably, the product of the invention may also present one or more of the following optional characteristics:
  The chromium oxide content is less than 98.3%.
  The alumina $Al_2O_3$ content is greater than 2%, preferably greater than 41 and/or less than 181, preferably less than 15%, preferably less than 12%, preferably less than 9%.
  The titanium oxide $TiO_2$ content is greater than 0.2%, preferably greater than 0.5%, preferably greater than 1%, more preferably greater than 1.5%, or even greater than 2% and/or less than 5%, preferably less than 4.5%.
  In an embodiment, the product does not include zirconia. In another embodiment, the content of zirconia ($ZrO_2$) is greater than 0.2%, greater than 1.0%, greater than 1.5%, greater than 2.0%, and/or less than 5.0%, or even less than 4.01, or less than 3.9%, or less than 3.6%, or less than 3.5%.
  Less than 20%, even less than 18%, even less than 15%, even less than 10% by weight of the zirconia is stabilized in cubic and/or quadratic (or tetragonal) form.
  The total content of oxide species other than $Cr_2O_3$, $Al_2O_3$, $ZrO_2$ and $TiO_2$ in the sintered product is less than 2.0%, preferably less than 1.0%, preferably less than 0.7%, more preferably less than 0.5%, and still more preferably, less than 0.2%, in percentage by weight based on the oxides. In particular, the content of silica $SiO_2$ is preferably less than 0.8%, less than 0.7%, less than 0.6%, less than 0.5%, preferably less than 0.3%, more preferably less than 0.1%, even substantially zero and/or the content of phosphorus oxide(s) is less than 1.0%, preferably less than 0.5%, or even substantially zero.
  The apparent porosity is less than 15%, preferably less than 10%, preferably less than 5%, preferably less than 2%, preferably less than 1%.
  The product presents apparent density greater than 4.0 grams per cubic centimeter ($g/cm^3$), preferably greater than 4.4 $g/cm^3$, preferably greater than 4.5 $g/cm^3$, or even greater than 4.6 $g/cm^3$.
  The product is in the form of a block, preferably presenting a weight greater than 5 kilogram (kg), preferably greater than 10 kg.

Also provided is a method of fabricating a sintered product, the method comprising the following steps:
  a) mixing raw materials to form a starting charge;
  b) shaping a green part from said starting charge;
  c) sintering said green part so as to obtain said sintered product, the method being remarkable in that the starting charge is determined in such a manner that said sintered product is in accordance with the invention.

Preferably, the method may also present one or more of the following optional characteristics:

Each of the particulate raw materials providing the oxides (oxide powders and optionally chamotte powder(s)) presents a median size of less than 150 micrometers (μm), preferably less than 100 μm, preferably less than 50 μm.

The product is fabricated from a starting charge in which the oxides $Cr_2O_3$, $Al_2O_3$, $TiO_2$, and optionally $ZrO_2$, are present in the form of particles of said oxides and optionally of particles of chamotte of said oxides, said particles together forming a powder mixture presenting a median size of less than 50 μm, preferably less than 40 μm, preferably less than 20 μm, preferably less than 10 μm, or even less than 5 μm.

The starting charge includes less than 10% and/or less than 50% of chamotte, in percentages by weight based on the oxides of the starting charge.

The chamotte presents a median size of less than 50 μm, preferably less than 40 μm, preferably less than 20 μm.

Shaping is performed by isostatic pressing.

The invention also provides a sintered product fabricated or capable of being fabricated by a method in accordance with the invention.

Finally, the invention provides the use of a sintered product according to the invention or fabricated or capable of being fabricated by a method according to the invention, in a glass-making furnace, in particular in a zone of the furnace that is likely to come into contact with molten glass or with fumes given off by molten glass, e.g. in a circuit for venting fumes to the atmosphere.

Thus, the invention also provides an installation including a product according to the invention, said product being located in a region of said installation where it is likely to come into contact with an oxidizing environment at more than 1000° C. or with fumes given off by molten glass. In particular, the product may be placed in a region of said tank where it is likely to come into contact with molten glass, in particular a reinforcing glass e.g. of the E-glass, R-glass, or S-glass type, an AR-glass (Alkali Resistant), or even a glass for insulating fibers.

Other characteristics and advantages of the invention will become apparent further on reading the following detailed description.

DEFINITIONS

The term "impurities" is used to mean the inevitable ingredients that are necessarily introduced together with the raw materials or that result from reactions with said ingredients. Impurities are not necessary ingredients, they are merely tolerated.

The "size" of a particle designates the average of its greatest dimension dM and its smallest dimension dm, i.e. (dM+dm)/2.

Conventionally, the "maximum size" of a particle corresponds to the smallest standard screen mesh through which said particle can pass.

Conventionally, the term "median size" of a mixture of particles is used to designate the size that divides the particles of the mixture into first and second populations presenting equal numbers of particles, the first and second populations comprising only particles having a size that is greater than, or respectively less than, the median size.

An E-glass presents the following chemical analysis, according to ASTM standard D 578-05, "Standard specification for glass fiber strands", in percentages by weight:

$B_2O_3$: 0%-10%
CaO: 16%-25%
$Al_2O_3$: 12%-16%
$SiO_2$: 52%-62%
MgO: 0%-5%
alkaline oxides: 0%-2%
$TiO_2$: 0%-1.5%
$Fe_2O_3$: 0.05%-0.8%
fluorine: 0%-1%.

Unless specified to the contrary, whenever reference is made to the sintered product or to the starting charge, all percentages are percentages by weight based on the oxides.

DETAILED DESCRIPTION

A product according to the invention may be fabricated in accordance with above-described steps a) to c).

Those steps are conventional, however in step a), the starting charge is determined, in a manner well known to the person skilled in the art, so that the sintered product obtained at the end of step c) presents contents in $Cr_2O_3$, $Al_2O_3$ and $TiO_2$ that lie within the above-described ranges of the invention, and in particular in the preferred ranges.

A minimum content of 0.1% $TiO_2$ is considered as being necessary for obtaining a useful technical effect. The content of $TiO_2$ must be limited in order to avoid reducing corrosion resistance.

In one embodiment, no zirconia is added to the starting charge. However, in another embodiment, the starting charge is determined in such a manner that the sintered product includes 0.2% to 5% $ZrO_2$. This advantageously improves its ability to withstand thermal shocks.

The starting charge is preferably also determined in such a manner that the total content of oxide species other than $Cr_2O_3$, $Al_2O_3$, $ZrO_2$ and $TiO_2$ in the sintered product, referred to below as "other oxide species", is less than 2.0%, preferably less than 1.0%, preferably less than 0.7%, more preferably less than 0.5%, and still more preferably less than 0.2%, the percentages being by weight based on the oxides.

By definition, the other oxide species constitute the balance up to 100% from the oxides $Cr_2O_3$, $Al_2O_3$, $ZrO_2$ and $TiO_2$. Limiting the total content of these other oxide species thus makes it possible, advantageously, to increase the content of the oxides $Cr_2O_3$, $Al_2O_3$, $ZrO_2$ and $TiO_2$, and in particular the content of chromium oxide. It also makes it possible to limit the content of harmful species, such as silica, the presence of which tends to reduce corrosion resistance.

Preferably, the other oxide species are constituted by impurities, i.e. no species other than $Cr_2O_3$, $Al_2O_3$, $ZrO_2$, and $TiO_2$ is introduced into the starting charge for the purpose of modifying the composition of the sintered product. At contents of less than 2.0% in the sintered product, in percentage by weight based on the oxides, it is considered that impurities do not have any effect that substantially modifies the result obtained. Preferably, the total content of impurities in the sintered product is less than 0.7%, more preferably less than 0.5%, in percentages by weight of the oxides.

Preferably, the content of each of the impurities in the sintered product is less than 0.5%, less than 0.3%, or even less than 0.1% or less than 0.05%.

In particular, the impurities comprise $Fe_2O_3$, $P_2O_5$, $SiO_2$, MgO, CaO, and alkali oxides such as $Na_2O$.

Preferably, the starting charge is determined in such a manner that, in the sintered product, in percentages by weight based on the oxides:

$Fe_2O_3 < 0.2\%$, preferably $Fe_2O_3 < 0.1\%$, more preferably $Fe_2O_3 < 0.08\%$; and/or
$P_2O_5 < 1\%$, preferably $P_2O_5 < 0.5\%$; and/or
$SiO_2 < 0.6\%$, preferably $SiO_2 < 0.3\%$, preferably $SiO_2 < 0.1\%$.

The starting charge is also determined so that the oxides preferably represent more than 99.9% by weight of the sintered product, preferably about 100% by weight of the sintered product.

Preferably, each of the powders of the oxides $Cr_2O_3$, $Al_2O_3$, $ZrO_2$ and $TiO_2$ presents a median size of less than 150 µm, preferably less than 100 µm, preferably less than 50 µm. More preferably, the mixture of these powders presents a median size of less than 50 µm, preferably less than 40 µm, preferably less than 20 µm, preferably less than 10 µm, or even less than 5 µm. This advantageously improves densification of the part during the sintering step.

It is also preferable for the starting charge to include more than 10% of chamotte. The structure of chamotte particles advantageously improves compacting while the green part is being formed.

The chamotte may be obtained by sintering powders of $Cr_2O_3$ and/or $Al_2O_3$ and/or $TiO_2$ and/or $ZrO_2$, and then grinding. The chamotte may in particular come from recycling a product of the invention.

The maximum particle size of the chamotte is preferably less than 150 µm, preferably less than 100 µm. Preferably, the chamotte powder presents a median size less than 50 µm, preferably less than 20 µm.

The chamotte content is preferably less than 50%, or even less than 30%.

In addition to the raw materials measured out so that the sintered product has the desired average chemical composition by weight, the starting charge may also conventionally include usual binders, e.g. an organic binder and/or deflocculants.

In step b), the mixture prepared in step a) may be poured into a mold, and then shaped, so as to form a green part.

Preferably, the mold is shaped in such a manner that the resulting sintered product is in the form of a block presenting a weight greater than 5 kg, preferably greater than 10 kg. Such blocks are well adapted to the intended applications.

By way of example, shaping may result from isostatic pressing, from slipcasting, from uniaxial pressing, from casting a gel, from vibro-casting, or from a combination of these techniques.

Preferably, it is the result of isostatic pressing at pressures greater than 100 megapascal (MPa). Indeed, this technique leads to sintering that is more reactive and to obtaining sintered products of greater density. The apparent porosity of the sintered products may thus be less than 15%, preferably less than 10%, preferably less than 5%, preferably less than 2%, preferably less than 1%. Their apparent density may be greater than 4 g/cm³.

In step c), the green part is sintered.

Sintering is preferably performed at a temperature lying in the range 1400° C. to 1700° C., under a reducing or oxidizing atmosphere, preferably under a reducing atmosphere, and preferably at atmospheric pressure.

At the end of sintering, a sintered product according to the invention is obtained.

Advantageously, a sintered product fabricated by the above method presents a sublimation resistance index Is, measured in accordance with the test defined below, which index is greater than 150, preferably greater than 175, more preferably greater than 200.

In particular, excellent performance has been obtained when the product is fabricated from a starting charge comprising 2% to 12% $Al_2O_3$ and 3% to 5% $TiO_2$, in percentages by weight based on the dry weight of the oxides of the starting charge.

The following non-limiting examples are given for the purpose of illustrating the invention.

In these examples, the following raw materials were selected for use, the percentages given being percentages by weight based on the oxides:

chromium oxide powder comprising about 99.5% $Cr_2O_3$ and with a median size of 2.8 µm;
alumina powder with a median size of about 3 µm;
titanium oxide powder comprising about 95% $TiO_2$ and with a median size of 2.3 µm.

Sintered refractory blocks were fabricated in accordance with above-described steps a) to c).

In step b), the mixture was shaped by isostatic pressing so as to form green parts having dimensions of 100 millimeters (mm)×100 mm, with a height of about 150 mm.

In step c), the green parts were then sintered under a reducing atmosphere at atmospheric pressure and at a sintering temperature of 1550° C.

In order to measure corrosion resistance and sublimation resistance, samples in the form of cylindrical bars of product having a diameter of 20 mm and a height of 100 mm were taken and were subjected to a test consisting in causing the immersed samples to rotate in a bath of molten E-glass for reinforcing fibers at a temperature of 1550° C. The speed of rotation about the axis of the sample carrier was 6 revolutions per minute (rpm). Such a speed serves to renew the corrosion interface very frequently and thus make the test much more severe. The test continued for 180 hours. At the end of that period, for each sample, the immersed portion and the emerging portion were separated. For each portion, the remaining volume of the sample was evaluated, and then by taking the difference, the volume lost during the test was evaluated. Thereafter, the volume percentage loss was calculated by taking the ratio of the lost volume to the initial volume. The volume percentage loss of a sample of the reference product (example 1) was selected as a basis for comparison.

The ratio of the volume percentage loss due to corrosion from the immersed part of the reference product sample to the volume percentage loss due to corrosion from immersed part of any of the samples, multiplied by 100, gives an evaluation of the resistance to corrosion by glass of the sample tested compared with that of the reference product. "Ic" designates the corrosion index, as defined in this way, in Table 1 below, and also in the claims.

Thus, corrosion indices greater than 100 correspond to smaller losses due to corrosion than that from the reference product. The products in question thus present better resistance to corrosion by molten glass than that of the reference product. Corrosion indices of less than 100 correspond to greater losses due to corrosion than that from the reference product. The products in question thus present resistance to corrosion by molten glass that is not as good as that of the reference product.

The ratio of the volume percentage loss due to sublimation from the emerging part of the reference product sample to the volume percentage loss due to sublimation from emerging part of any of the samples, multiplied by 100, gives an evaluation of the sublimation resistance of the sample tested, compared with that of the reference product. "Is" designates the sublimation index, as defined in this way, in Table 1 below, and also in the claims.

Thus, sublimation indices greater than 100 correspond to smaller losses due to sublimation than that from the reference product. The products in question thus present better resistance to sublimation than that of the reference product. Sublimation indices of less than 100 correspond to greater losses due to sublimation than that from the reference product. The products in question thus present sublimation resistance that is not as good as that of the reference product. It is considered herein that sublimation resistance is particularly satisfactory when the sublimation index Is is greater than or equal to 120 (on the basis of example 1).

Example 1 product, the reference product, is the C1215 product sold by Saint-Gobain SEFPRO. That product is presently in use for tanks of glass-melting furnaces.

Table 1 summarizes the results obtained.

The average chemical analysis of the various tested products is stated in percentages by weight based on the oxides. The balance up to 100% corresponds to impurities.

TABLE 1

| | Composition by weight | | | | | | |
|---|---|---|---|---|---|---|---|
| n° | % $Cr_2O_3$ | % $Al_2O_3$ | % $TiO_2$ | % $ZrO_2$ | Density (g/cm$^3$) | Ic | Is |
| 1** | 94.2 | | 3.8 | | 4.33 | 100 | 100 |
| 2 | 93.5 | 2.5 | 4.0 | | 4.78 | 118 | 130 |
| 3 | 91.0 | 5.0 | 4.0 | | 4.72 | 115 | 239 |
| 4 | 86.0 | 10.0 | 4.0 | | 4.58 | 106 | 288 |
| 5 | 76.0 | 20.0 | 4.0 | | 4.59 | 100 | N/A |
| 6 | 88.5 | 5.0 | 3.0 | 3.5 | 4.81 | 100 | 110 |

**example not according to the invention.

Table 1 shows that the tested products according to the invention present sublimation resistance that is considerably improved.

Their corrosion resistance remains acceptable. It may even be significantly better than that of the product of example 1.

Naturally, the present invention is not limited to the embodiments described and shown, given by way of non-limiting illustrative examples.

The invention claimed is:

1. A sintered product comprising in percentages by weight based on the oxides:
   $Cr_2O_3$: 72.0%-98.9%
   2%<$Al_2O_3$≤20%
   0.5%≤$TiO_2$≤6.0%
   $ZrO_2$≤4.0%
   $SiO_2$≤0.9%.

2. The product according to claim 1, fabricated from a starting charge in which the $Cr_2O_3$, $Al_2O_3$, $TiO_2$ and optionally $ZrO_2$ oxides are present in a form of particles of said oxides and optionally particles of chamotte of said oxides, said particles together forming a powder mixture presenting a median size of less than 50 μm.

3. The product according to claim 1, fabricated from a starting charge in which the $Cr_2O_3$, $Al_2O_3$, $TiO_2$ and optionally $ZrO_2$ oxides are present in a form of particles of said oxides and optionally particles of chamotte of said oxides, said particles together forming a powder mixture presenting a median size of less than 10 μM.

4. The product according to claim 1, fabricated from a starting charge in which each particulate raw material providing the oxides has a median size of less than 150 μm.

5. The product according to claim 1, fabricated from a starting charge including at least 10% of chamotte, in percentage by weight based on the oxides.

6. The product according to claim 1, fabricated from a starting charge in which each of the oxide powders, and optionally the chamotte powder, presents a median size of less than 150 μm.

7. The product according to claim 1, having a zirconia $ZrO_2$ content greater than 0.2%.

8. The product according to claim 7, having a zirconia $ZrO_2$ content greater than 2.0%.

9. The product according to claim 1, wherein the alumina $Al_2O_3$ content is less than 18%.

10. The sintered product according to claim 9, wherein the alumina $Al_2O_3$ content is greater than 4.0% and less than 9%.

11. The product according to claim 1, wherein the titanium oxide $TiO_2$ content is less than 5%.

12. The product according to claim 1, wherein the titanium oxide $TiO_2$ content is greater than 1.5% and less than 4.5%.

13. The product according to claim 1, wherein
    $Fe_2O_3$<0.2% and/or
    $P_2O_5$<1% and/or
    $SiO_2$<0.5%.

14. The product according to claim 1, in the form of a block having a weight greater than 5 kg.

15. An installation including the product according to claim 1, said product being disposed in a region of said installation where it is likely to come into contact with an oxidizing environment at above 1000° C. or with fumes given off by molten glass.

16. A tank including the product according to claim 1, said product being disposed in a region of said tank where it is likely to come into contact with molten glass.

17. The tank according to claim 16, wherein said molten glass is a reinforcing glass of an E-glass, R-glass or S-glass type, an AR-glass, or a glass for insulating fibers.

* * * * *